(12) United States Patent
Uehara

(10) Patent No.: US 10,330,885 B2
(45) Date of Patent: Jun. 25, 2019

(54) LENS RETAINING METHOD, METHOD FOR MANUFACTURING LENS-PORTION SET, AND LENS-PORTION SET

(71) Applicant: OLYMPUS CORPORATION, Hachioji-shi, Tokyo (JP)

(72) Inventor: Takeshi Uehara, Suwa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/676,789

(22) Filed: Aug. 14, 2017

(65) Prior Publication Data

US 2018/0052297 A1 Feb. 22, 2018

(30) Foreign Application Priority Data

Aug. 22, 2016 (JP) ................... 2016-161809

(51) Int. Cl.
*G02B 7/02* (2006.01)

(52) U.S. Cl.
CPC .................... *G02B 7/025* (2013.01)

(58) Field of Classification Search
CPC ..................................... G02B 7/025
USPC ........................... 359/642, 811, 819
See application file for complete search history.

(56) References Cited

U.S. PATENT DOCUMENTS 5,446,591 A * 8/1995 Medlock .................. G02B 3/12
359/665
2003/0043728 A1 3/2003 Kan et al.

FOREIGN PATENT DOCUMENTS

JP 2003066301 A 3/2003
JP 2013254062 A 12/2013

* cited by examiner

*Primary Examiner* — Tuyen Tra
(74) *Attorney, Agent, or Firm* — Holtz, Holtz & Volek PC

(57) ABSTRACT

A lens retaining method for retaining a lens in a lens retaining frame includes: arranging the lens in the lens retaining frame such that a lens surface of the lens is brought into contact with a protrusion of the lens retaining frame that protrudes in a radial direction; filling, after the lens has been arranged, an adhesive into a space formed between the lens surface and the protrusion, the space being partitioned in an axial direction by the lens surface and the protrusion; and curing the adhesive after the adhesive has been filled into the space.

20 Claims, 16 Drawing Sheets

LENS RETAINING METHOD, METHOD FOR MANUFACTURING LENS-PORTION SET, AND LENS-PORTION SET

CROSS REFERENCE TO RELATED APPLICATIONS

This application is based upon and claims the benefit of priority from prior Japanese Patent Application No. 2016-161809, filed Aug. 22, 2016, the entire contents of which are incorporated herein by this reference.

BACKGROUND OF THE INVENTION

Field of the Invention

The present invention relates to a lens retaining method, a method for manufacturing a lens-portion set, and a lens-portion set.

Description of the Related Art

A microscope objective is designed to realize a desired function using a plurality of lenses. Each lens that constitutes a microscope objective is generally fixed in a lens retaining frame with an adhesive applied to a surface (hereinafter referred to as a lens edge surface) that links edges of two lens surfaces. Japanese Laid-open Patent Publication No. 2013-254062 discloses a lens-portion set that is formed by adhering a lens and a lens retaining frame on a lens edge surface.

SUMMARY OF THE INVENTION

A lens retaining method according to an aspect of the present invention is a lens retaining method for retaining a lens in a lens retaining frame, and includes: arranging the lens in the lens retaining frame such that a lens surface of the lens is brought into contact with a protrusion of the lens retaining frame that protrudes in a radial direction; filling, after the lens has been arranged, an adhesive into a space formed between the lens surface and the protrusion, the space being partitioned in an axial direction by the lens surface and the protrusion; and curing the adhesive after the adhesive has been filled into the space.

A method for manufacturing a lens-portion set according an aspect of the present invention is a method for manufacturing a lens-portion set in which a lens and a lens retaining frame are adhered with an adhesive, and includes: arranging the lens in the lens retaining frame such that a lens surface of the lens is brought into contact with a protrusion of the lens retaining frame that protrudes in a radial direction; filling, after the lens has been arranged, an adhesive into a space formed between the lens surface and the protrusion, the space being partitioned in an axial direction by the lens surface and the protrusion; and curing the adhesive after the adhesive has been filled into the space.

A lens-portion set according to an aspect of the present invention includes: a lens retaining frame that has a protrusion that protrudes in a radial direction; a lens that has a lens surface and is arranged in the lens retaining frame such that the lens surface is brought into contact with the protrusion; and an adhesive that is filled into a space between the lens surface and the protrusion, the space being partitioned in an axial direction by the lens surface and the protrusion.

BRIEF DESCRIPTION OF THE DRAWINGS

The present invention will be more apparent from the following detailed description when the accompanying drawings are referenced.

DESCRIPTION OF THE EMBODIMENTS

It is preferable that a microscope objective have at least one of a high numerical aperture and a long working distance. However, the larger the numerical aperture and the longer the working distance, the larger the diameter of the effective light flux passing through the microscope objective lens becomes. If a lens outer diameter is increased in accordance with the diameter of an effective light flux becoming larger, two lens surfaces will be linked directly, which results in forming a lens without a lens edge surface. It is difficult to retain the lens without a lens edge surface (hereinafter referred to as a lens without an edge surface) by a method similar to the method for retaining a lens with a lens edge surface (hereinafter referred to as a lens with an edge surface). Thus, there is a need for a new lens retaining method that makes it possible to retain a lens regardless of a lens shape.

A method for retaining a lens in each of a plurality of lens retaining frames that are arranged in a layered formation in an optical axis direction in the body of a microscope objective will be described below. As used herein, a combination of a lens and a lens retaining frame that retains the lens is referred to as a lens-portion set. Thus, the method for retaining a lens in a lens retaining frame is also a method for manufacturing a lens-portion set.

Figure 1:
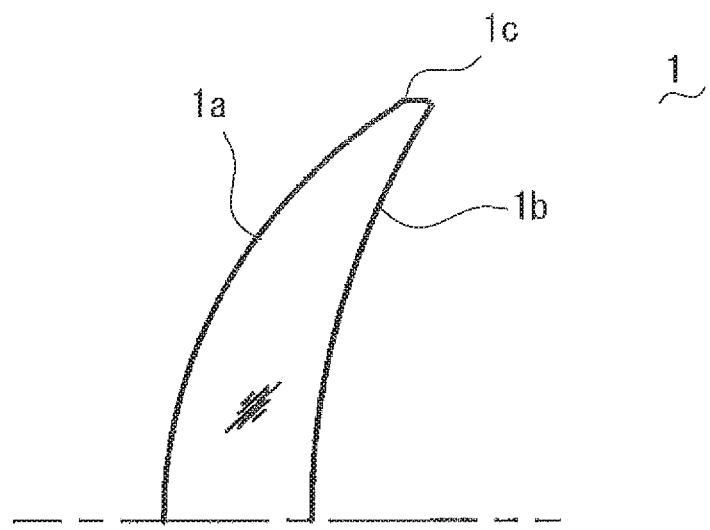
FIG. 1 illustrates an example of a lens with an edge surface.
Figure 2:
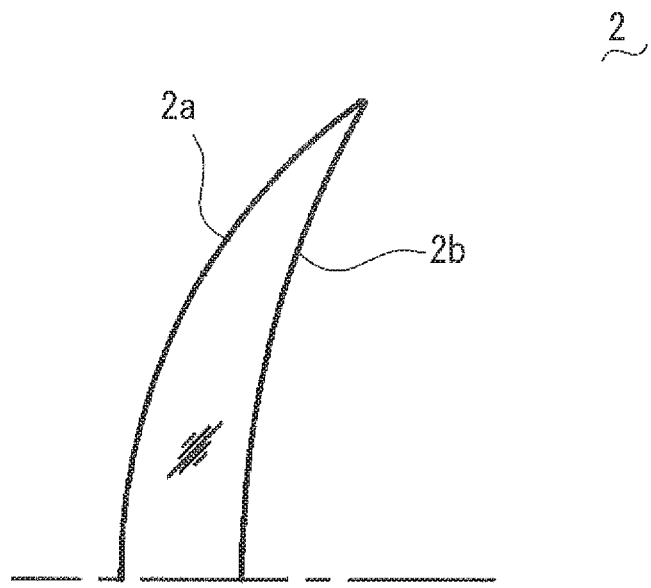
FIG. 2 illustrates an example of a lens without an edge surface.

In a lens-portion set according to each embodiment, a lens and a lens-portion frame are adhered with an adhesive. A lens that constitutes a lens-portion set may be a lens 1 with an edge surface, illustrated in FIG. 1, that has a lens edge surface 1c between a lens surface 1a and a lens surface 1b, or it may be a lens 2 without an edge surface, illustrated in FIG. 2, in which a lens surface 2a and a lens surface 2b are linked directly.

First Embodiment

Figure 3:
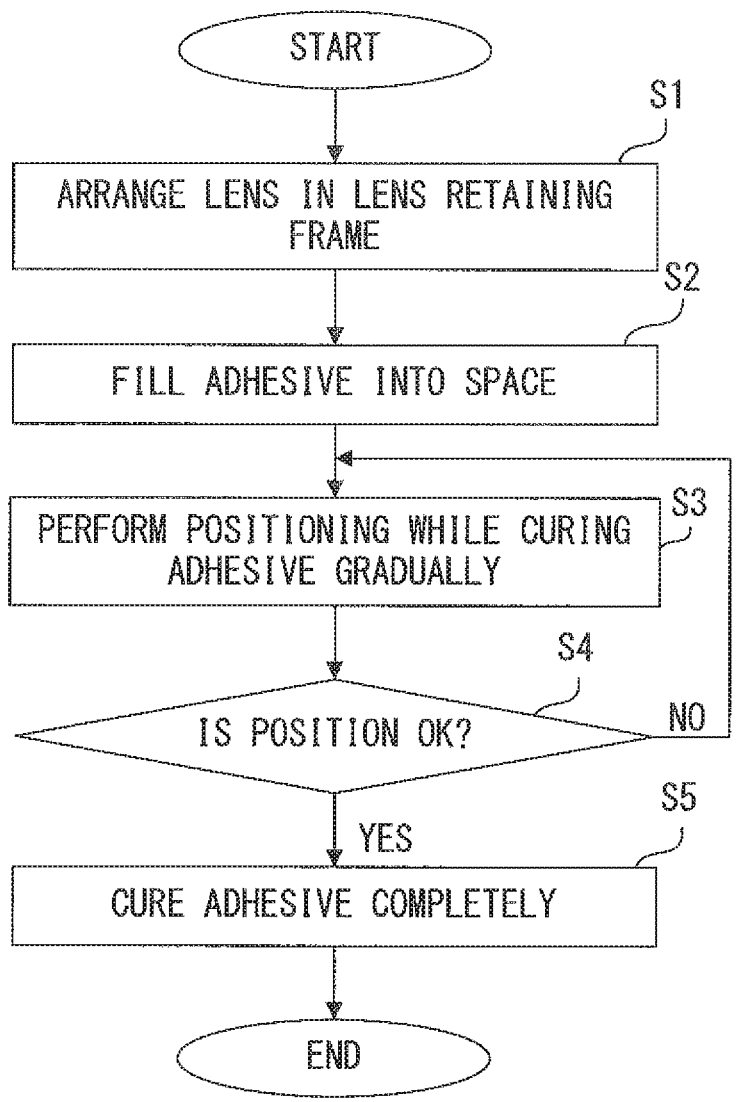
FIG. 3 is a flowchart that illustrates a method for manufacturing a lens-portion set.
Figure 4:
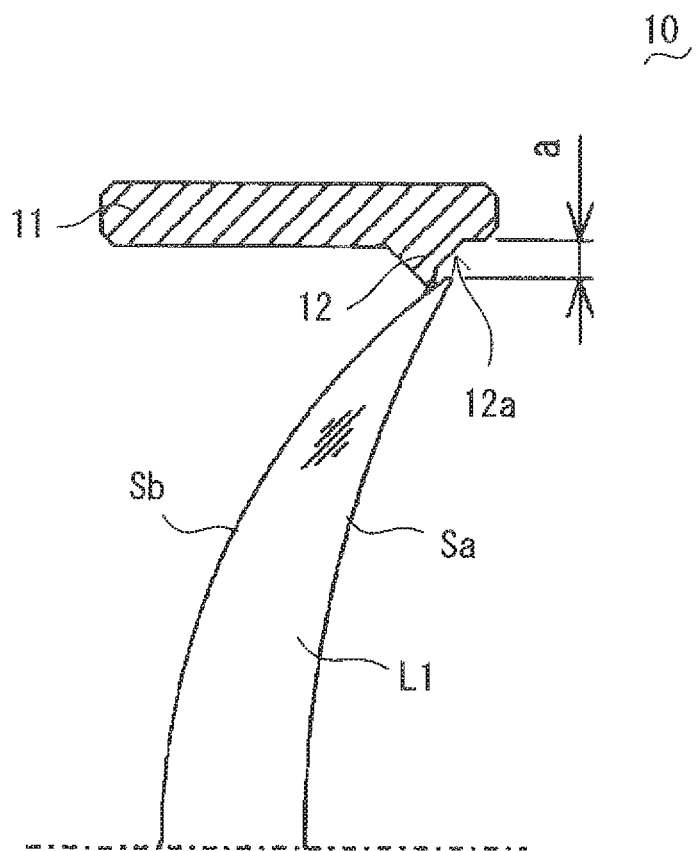
FIG. 4 is a cross-sectional view of the lens-portion set before an adhesive is applied according to a first embodiment.
Figure 5:
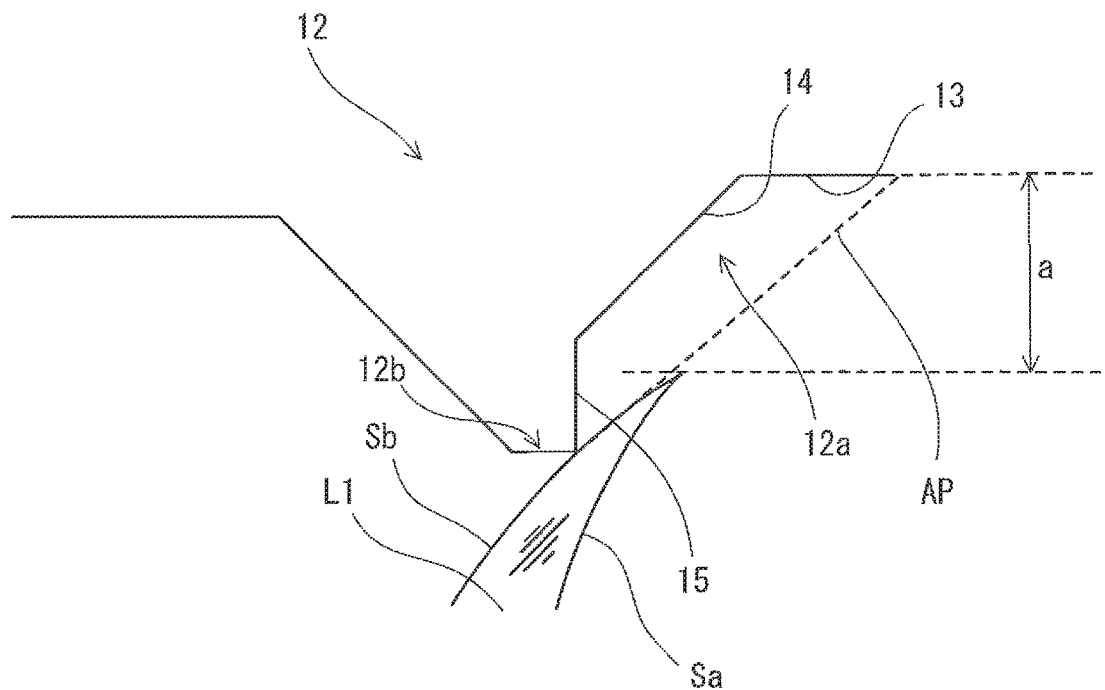
FIG. 5 is an enlarged view of a protrusion of a lens retaining frame illustrated in FIG. 4.
Figure 6:
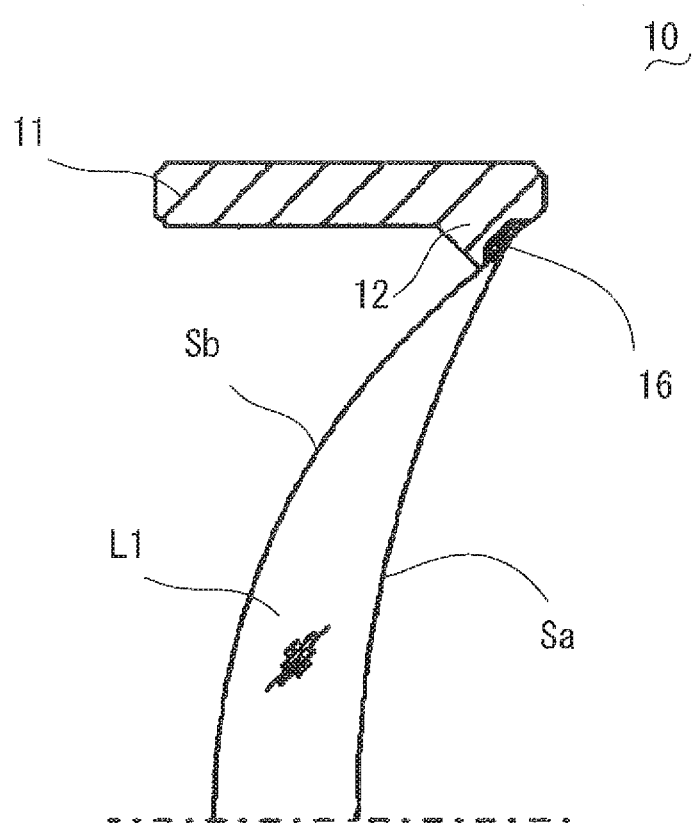
FIG. 6 is a cross-sectional view of the lens-portion set after an adhesive is applied according to the first embodiment.

FIG. 3 is a flowchart that illustrates a method for manufacturing a lens-portion set 10 according to the present embodiment. FIG. 4 is a cross-sectional view of the lens-portion set 10 before an adhesive is applied according to the present embodiment. FIG. 5 is an enlarged view of a protrusion 12 of a lens retaining frame 11 illustrated in FIG. 4. FIG. 6 is a cross-sectional view of the lens-portion set 10 after an adhesive 16 is applied according to the present embodiment. The method for manufacturing the lens-portion set 10 is described below with reference to FIGS. 3 to 6.

First, a lens L1 is arranged in the lens retaining frame 11 (Step S1 in FIG. 3). The lens L1 is a lens that constitutes a microscope objective, and as illustrated in FIG. 4, the lens L1 is a meniscus lens without an edge surface that has a concave lens surface Sa and a convex lens surface Sb. The lens retaining frame 11 is a tubular member that is inserted into the body of the microscope objective when the microscope objective is assembled. As illustrated in FIG. 4, the lens retaining frame 11 has a protrusion 12 that protrudes in a radial direction (specifically, inward in the radial direction). As illustrated in FIG. 5, a concavity 12a whose aperture AP is oriented in an axial direction and that is constituted of a surface 13, a surface 14, and a surface 15 is formed in the protrusion 12.

The radial direction is a radial direction of the tubular lens retaining frame 11 (a tubular body), and the axial direction is an axial direction of the tubular lens retaining frame 11 (the tubular body). The aperture oriented in the axial direction is an aperture, such as the aperture AP illustrated in FIG. 5, in which a route from the outside of the concavity 12a to the inside of the concavity 12a is ensured along the axial direction.

In Step S1, the lens L1 is arranged in the lens retaining frame 11 such that the lens surface Sb of the lens L1 is brought into contact with the protrusion 12. In particular, the lens L1 is arranged in the lens retaining frame 11 such that the lens L1 covers at least a portion of the concavity 12a. For example, the lens L1 may be brought close to the lens retaining frame 11 along the axial direction of the lens retaining frame 11 from the direction in which the aperture AP of the concavity 12a is oriented (from the right side of FIG. 5). Then, the lens L1 may be arranged in the lens retaining frame 11 by bringing the lens surface Sb of the lens L1 into contact with an edge portion of a receiving portion 12b of the protrusion 12 such that a gap (a) is created between the surface 13 that constitutes the concavity 12a and the lens L1. The receiving portion 12b is formed at a position that protrudes further in the radial direction than an end (that is, an edge) of the lens L1 in the radial direction. In FIG. 5, the lens surface Sb of the lens L1 is brought into contact with the edge portion of the receiving portion 12b of the protrusion 12 at a certain point, but the lens retaining frame 11 is tubular, so actually, the lens surface Sb of the lens L1 is brought into contact with the edge portion on its circumference.

The gap (a) serves as an inlet to introduce an adhesive as described later. Thus, it is preferable that the gap (a) have a certain size and, specifically, a length greater than or equal to 0.5 mm in the radial direction.

The surface 13 is a surface that is situated outermost in the radial direction among the surfaces (the surfaces 13, 14, and 15) that form the concavity 12a. The maximum outer diameter of a lens that can be retained by the lens retaining frame 11 is limited by the inner diameter of the lens retaining frame 11 having the surface 13 as an inner surface. The surface 13 is hereinafter referred to as an inner diameter surface.

When the lens L1 has been arranged in the lens retaining frame 11, the adhesive 16 is then filled into a space formed between the lens surface Sb and the protrusion 12 and the space is being partitioned in the axial direction by the lens surface Sb and the protrusion 12 (Step S2 in FIG. 3). Specifically, the adhesive 16 is introduced into the concavity 12a through the gap (a) between the surface 13 and the lens L1 to fill the adhesive 16 into the concavity 12a, as illustrated in FIG. 6. For example, the adhesive 16 is filled into the concavity 12a by wiping off the unnecessary adhesive 16 and pushing the adhesive 16 into the concavity 12a at the same time. Further, the adhesive 16 may be filled into the concavity 12a by sucking in air from the concavity 12a through a narrow gap between the receiving portion 12b and the lens surface Sb. As a result, a portion that is included in the lens surface Sb of the lens L1 and covers a portion of the concavity 12a is brought into contact with the adhesive 16 filled into the concavity 12a so that the area of a surface of contact between the lens L1 and the adhesive 16 is ensured sufficiently.

The portion of the lens surface Sb that covers the portion of the concavity 12a is a portion that protrudes farther outward in the radial direction than the receiving portion 12b of the lens surface Sb, and can also be referred to as a portion that faces the concavity 12a of the lens surface Sb in the axial direction.

If the viscosity of the adhesive 16 in Step S2 is too low, the adhesive 16 filled into the concavity 12a will not remain and will escape from the concavity 12a, which may result in contaminating a lens surface of the lens L1 (for example, the lens surface Sa). Thus, it is preferable that the adhesive 16 have a viscosity high enough to remain in the concavity 12a and, for example, a viscosity that is greater than or equal to 30 Pa·s at a temperature of 23 degrees.

When the adhesive 16 has been filled into the space, the positioning of the lens L1 with respect to the lens retaining frame 11 is performed repeatedly while curing the adhesive 16 gradually (Steps S3 and S4 in FIG. 3). Here, a curing method according to the adhesive 16 is applied. For example, the adhesive 16 may be cured gradually by radiating ultraviolet rays if the adhesive 16 is a UV-curable adhesive, or the adhesive 16 may be cured gradually by applying heat if the adhesive 16 is a heat-curable adhesive. Then, fine adjustment is made to the position of the lens L1 with respect to the lens retaining frame 11 while curing the adhesive 16 gradually, so as to adjust the eccentricity of the lens L1. For example, the deflection of light coming from the lens L1 (transmitted light or reflected light) is detected by sliding the lens L1 on the receiving portion 12b along the lens surface Sb, so as to adjust the eccentricity of an optical axis of the lens L1 with respect to an outer surface of the lens retaining frame 11.

When the eccentricity of the lens L1 has been adjusted sufficiently and the positioning of the lens L1 has been terminated, the adhesive 16 is cured completely (Step S5 in FIG. 3). Here, as in Step S3, a curing method according to the adhesive 16 is applied. The lens L1 is fixed in the lens retaining frame 11 by curing the adhesive 16 completely. Accordingly, the lens-portion set 10 is completed. In the following descriptions, the curing in Step S3 and the curing in Step S5 are distinguished from each other by referring to the curing in Step S3 as pre-curing and referring to the curing in Step S5 as complete curing.

In the present embodiment, the boundary of the lens L1 and the adhesive 16 is part of the lens surface and has a surface shape. This makes it possible to ensure, between the lens L1 and the adhesive 16, an area in which there occurs a retention force sufficient to retain the lens L1. Accordingly, the lens retaining frame 11 is able to retain the lens L1 steadily through the adhesive 16.

Specifically, a portion of the lens surface Sb that protrudes farther outward in the radial direction than the receiving portion 12b is brought into contact with the adhesive 16. In other words, the contact area between the lens L1 and the adhesive 16 depends on the position at which the receiving portion 12b is brought into contact with the lens surface Sb. Thus, it is preferable that the shape of the lens retaining frame 11 be designed in advance such that the receiving portion 12b is brought into contact with the lens surface Sb at a position in which the contact area between the lens L1 and the adhesive 16 is a sufficient size. Specifically, for example, the shape of the lens retaining frame 11 may be designed in advance such that the contact area is nearly equal to the area of a lens edge surface of a conventional lens with an edge surface. This permits the lens retaining frame 11 to retain the lens L1 through the adhesive 16 with a retention force that is nearly equal to the retention force when a lens with an edge surface is retained in a lens retaining frame by a conventional method.

Further, in the present embodiment, it is possible to retain a lens without an edge surface with a sufficient lens retention force, so it is possible to use the lens without an edge surface as a lens that constitutes the lens-portion set 10. This results in being able to transmit a light flux having a larger effective diameter.

Thus, the present embodiment permits a realization of at least one of a high numerical aperture and a long working distance while retaining a lens with a sufficient retention force.

In the lens-portion set 10, a stress may be applied to the lens L1 due to, for example, the contraction of the adhesive 16 when the adhesive 16 is cured. The magnitude of the stress depends on the contact area between the adhesive 16 and the lens L1, and an amount of the adhesive 16. In the present embodiment, the contact area depends on a position at which the receiving portion 12b is brought into contact with the lens surface Sb, and the amount of the adhesive 16 depends on the size of the concavity 12a. Thus, it is possible to prevent an excessive stress due to, for example, the contraction of the adhesive 16, from being applied to the lens L1 by appropriately designing the shape of the lens retaining frame 11, especially the shape of the protrusion 12. This results in being able to suppress a distortion of the lens L1.

In the design of a microscope objective, the diameter of an effective light flux when the effective light flux is transmitted through each lens of the microscope objective is known. Thus, it is possible to prevent vignetting from occurring in the lens retaining frame 11 by designing the lens retaining frame 11 such that the protrusion 12 does not block the effective light flux, that is, such that the receiving portion 12b is brought into contact with the lens surface Sb in a position farther outward in the radial direction than the effective diameter of the lens L1.

Further, in the present embodiment, it is possible to adjust the eccentricity by sliding the lens surface Sb on the receiving portion 12b. The reason is that the receiving portion 12b is a chamfered flat plane surface and the lens surface Sb that is a curved surface is technically in contact with a certain point on the receiving portion 12b. Thus, it is possible to accurately assemble a microscope objective that has at least one of a high numerical aperture and a long working distance.

Figure 7:
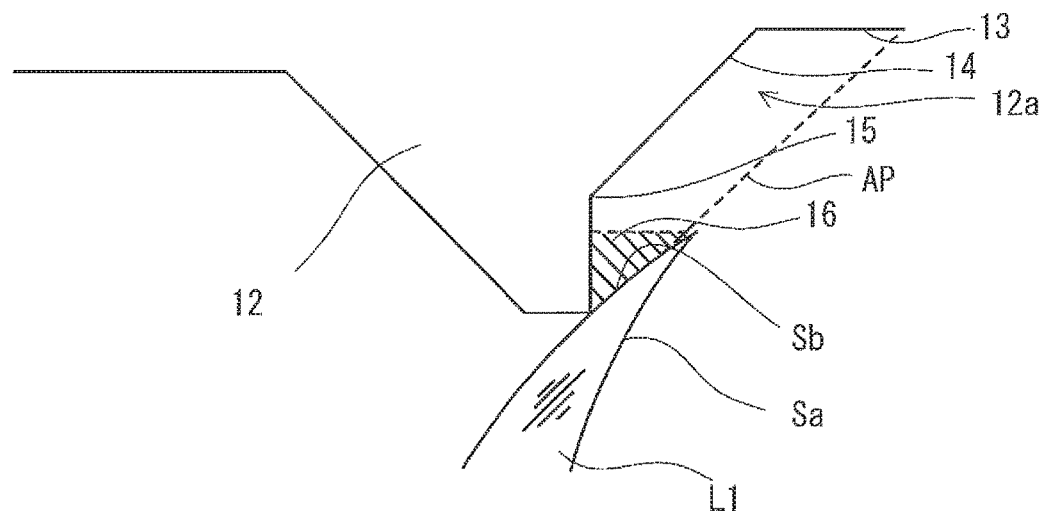
FIG. 7 illustrates a variation of the lens-portion set according to the first embodiment.

FIG. 7 illustrates a variation of the lens-portion set 10 according to the present embodiment. FIG. 6 illustrates an example of filling the adhesive 16 into the entirety of the concavity 12a. However, the adhesive 16 does not necessarily have to be filled into the entirety of the concavity 12a, and it is sufficient if it is possible to ensure a sufficient contact area between the adhesive 16 and the lens L1. Thus, as illustrated in FIG. 7, it is sufficient if the adhesive 16 is filled into at least a space formed between the lens surface Sb and the protrusion 12 and the space is partitioned in the axial direction by the lens surface Sb and the protrusion 12.

Figure 8:
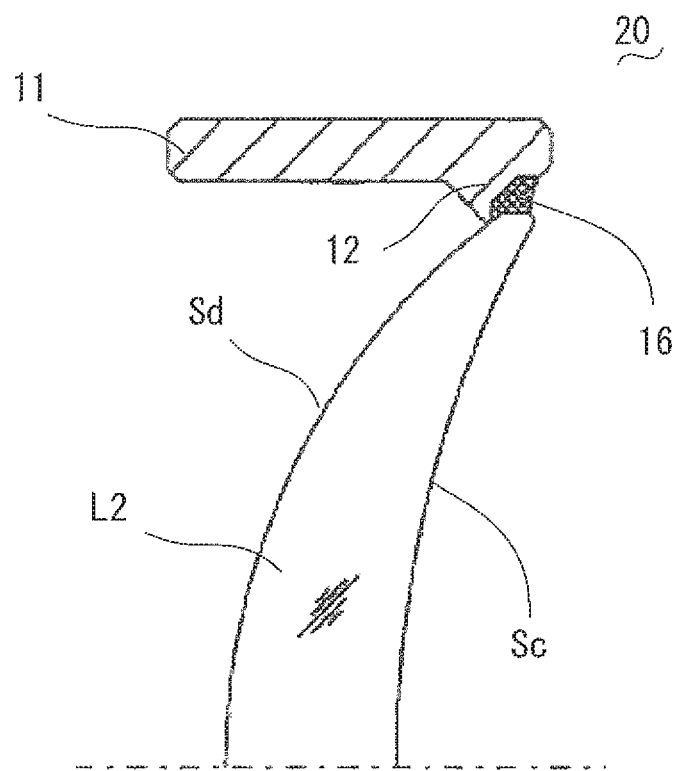
FIG. 8 illustrates another variation of the lens-portion set according to the first embodiment.

FIG. 8 illustrates another variation of the lens-portion set 10 according to the present embodiment. FIG. illustrates an example of the lens retaining frame 11 retaining the lens L1 that is a lens without an edge surface, but a lens retained by the lens retaining frame 11 is not limited to the lens without an edge surface. The lens retaining frame 11 may retain a lens L2 that is a lens with an edge surface, as in a lens-portion set 20 illustrated in FIG. 8. The lens L2 is a meniscus lens with an edge surface that has a concave lens surface Sc and a convex lens surface Sd.

Second Embodiment

Figure 9:
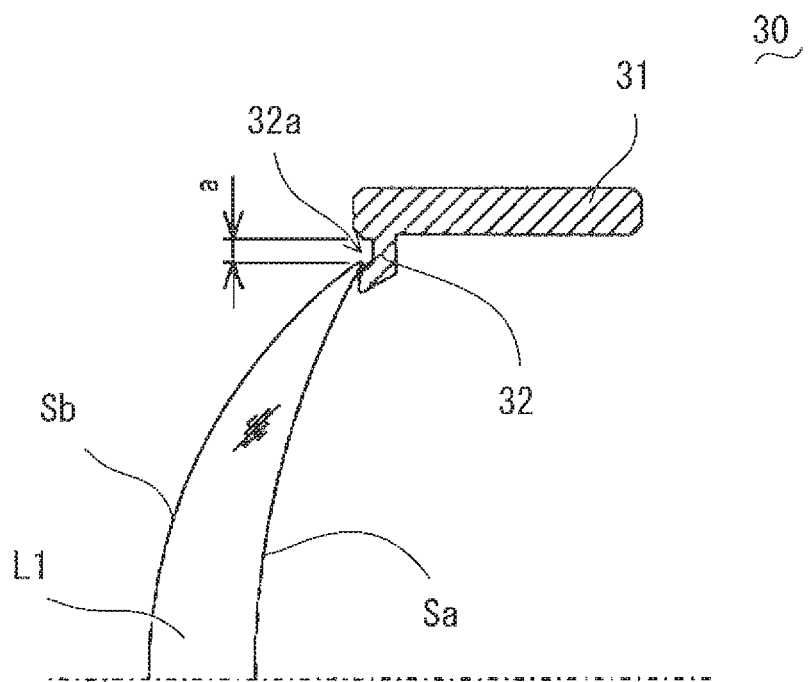
FIG. 9 is a cross-sectional view of a lens-portion set before an adhesive is applied according to a second embodiment.
Figure 10:
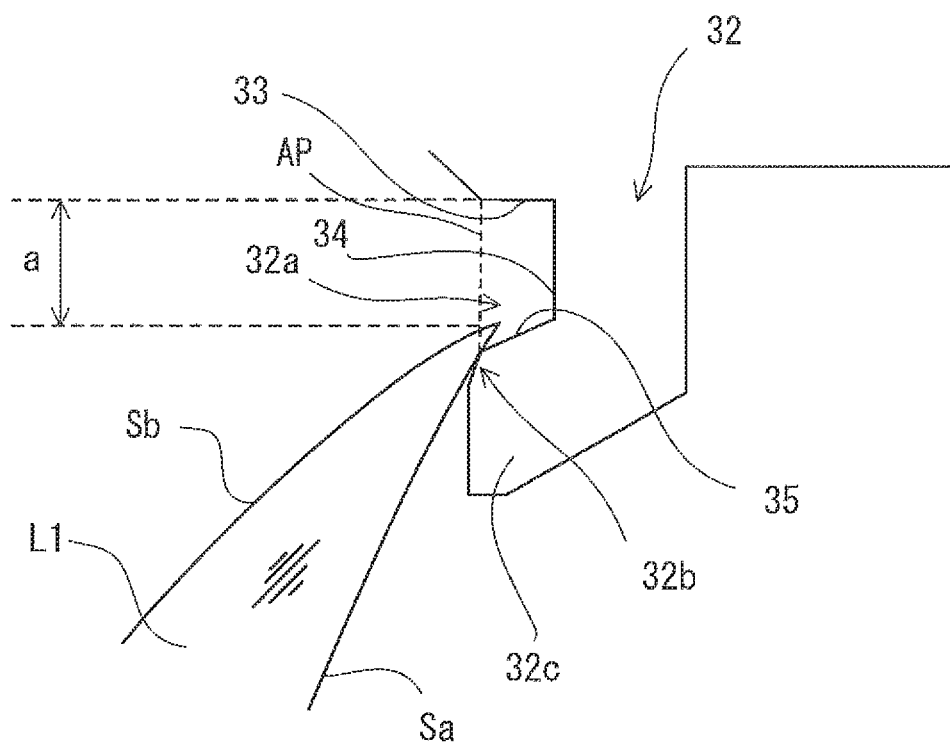
FIG. 10 is an enlarged view of a protrusion of a lens retaining frame illustrated in FIG. 9.
Figure 11:
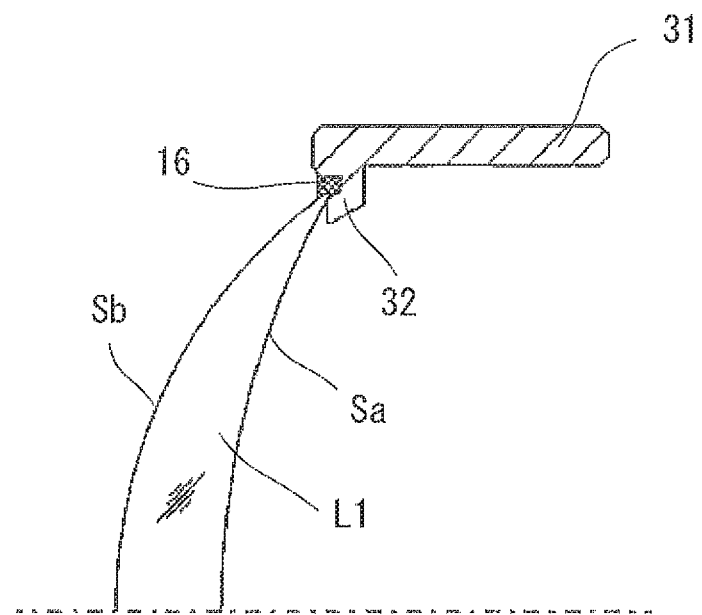
FIG. 11 is a cross-sectional view of the lens-portion set after an adhesive is applied according to the second embodiment.

FIG. 9 is a cross-sectional view of a lens-portion set 30 before an adhesive is applied according to the present embodiment. FIG. 10 is an enlarged view of a protrusion 32 of a lens retaining frame 31 illustrated in FIG. 9. FIG. 11 is a cross-sectional view of the lens-portion set 30 after an adhesive is applied according to the present embodiment. The lens-portion set 30 according to the present embodiment is different from the lens-portion set 10 in that it includes the lens retaining frame 31 instead of the lens retaining frame 11 and that the lens retaining frame 31 is in contact with the lens L1 on a concave surface (lens surface Sa).

The lens retaining frame 31 is a tubular member that is inserted into the body of the microscope objective when the microscope objective is assembled. As illustrated in FIG. 9, the lens retaining frame 31 has a protrusion 32 that protrudes in the radial direction (specifically, inward in the radial direction). As illustrated in FIG. 10, a concavity 32a whose aperture AP is oriented in the axial direction and that is constituted of a surface 33, a surface 34, and a surface 35 is formed in the protrusion 32. Further, as illustrated in FIG. 10, the protrusion 32 has a second protrusion 32c that protrudes in the axial direction, and a receiving portion 32b is formed in the second protrusion 32c.

The lens-portion set 30 according to the present embodiment is also manufactured by a procedure similar to the procedure illustrated in FIG. 3. Specifically, first, the lens L1 is arranged in the lens retaining frame 31 such that the lens surface Sa of the lens L1 is brought into contact with the protrusion 32 (Step 1 in FIG. 3). In particular, the lens L1 is arranged in the lens retaining frame 31 such that the lens L1 covers at least a portion of the concavity 32a. For example, the lens L1 may be brought close to the lens retaining frame 31 in the axial direction of the lens retaining frame 31 from the direction in which the aperture AP of the concavity 32a is oriented (from the left side of FIG. 9). Then, the lens L1 may be arranged in the lens retaining frame 31 by bringing the lens surface Sa of the lens L1 into contact with the second edge portion 32c (specifically, the receiving portion 32b) such that a gap (a) is created between the surface 33 that constitutes the concavity 32a and the lens L1.

The surface 33 is a surface that is situated outermost in the radial direction among the surfaces that form the concavity 32a, and is the inner diameter surface of the lens retaining frame 31. It is preferable that the gap (a) have a length greater than or equal to 0.5 mm in the radial direction.

When the lens L1 has been arranged in the lens retaining frame 31, the adhesive 16 is then filled into a space formed between the lens surface Sa and the protrusion 32 and the space is being partitioned in the axial direction by the lens surface Sa and the protrusion 32 (Step S2 in FIG. 3). Here, the adhesive 16 is introduced into the concavity 32a through the gap (a) to fill the adhesive 16 into the concavity 32a, as illustrated in FIG. 11. Then, the positioning of the lens L1 with respect to the lens retaining frame 31 is performed repeatedly while curing the adhesive 16 gradually (Steps S3 and S4 in FIG. 3), and the adhesive 16 is cured completely after the eccentricity of the lens L1 has been adjusted (Step S5 in FIG. 3).

As in the first embodiment, the present embodiment permits a realization of at least one of a high numerical aperture and a long working distance while retaining a lens with a sufficient retention force. Further, as in the first embodiment, various modifications may be made to the present embodiment.

Figure 12:
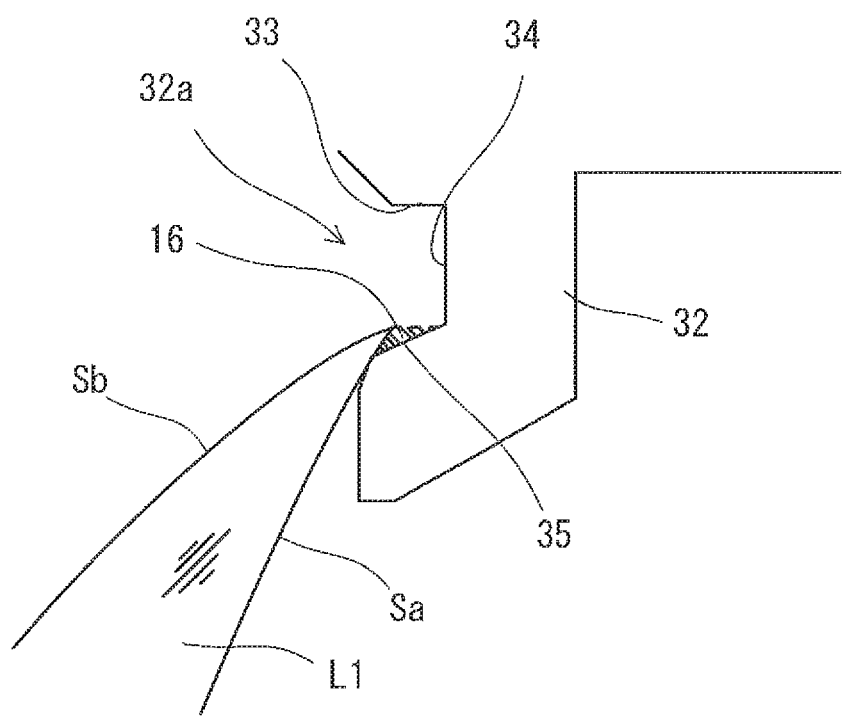
FIG. 12 illustrates a variation of the lens-portion set according to the second embodiment.
Figure 13:
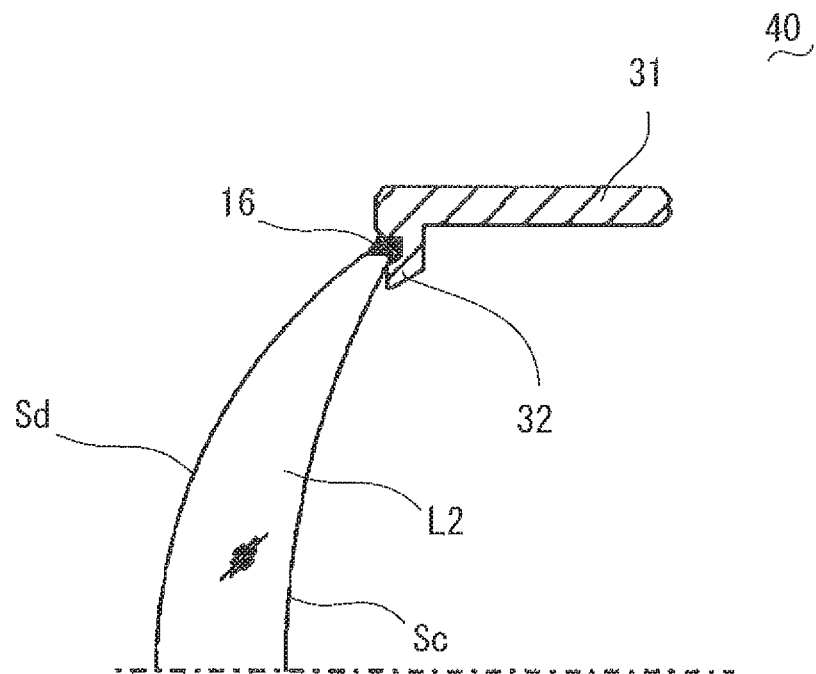
FIG. 13 illustrates another variation of the lens-portion set according to the second embodiment.

FIGS. 12 and 13 illustrate variations of the lens-portion set 30 according to the present embodiment. FIG. 11 illustrates an example of filling the adhesive 16 into the entirety of the concavity 32a, but the adhesive 16 does not necessarily have to be filled into the entirety of the concavity 32a. Thus, as illustrated in FIG. 12, it is sufficient if the adhesive 16 is filled into at least a space in the concavity 32a formed between the lens surface Sa and the protrusion 32 and the space is partitioned in the axial direction by the lens surface Sa and the protrusion 32. Further, FIG. 11 illustrates an example of the lens retaining frame 31 retaining the lens L1 that is a lens without an edge surface, but a lens retained by the lens retaining frame 31 is not limited to the lens without an edge surface. The lens retaining frame 31 may retain the lens L2 that is a lens with an edge surface, as in a lens-portion set 40 illustrated in FIG. 13.

Third Embodiment

Figure 14:
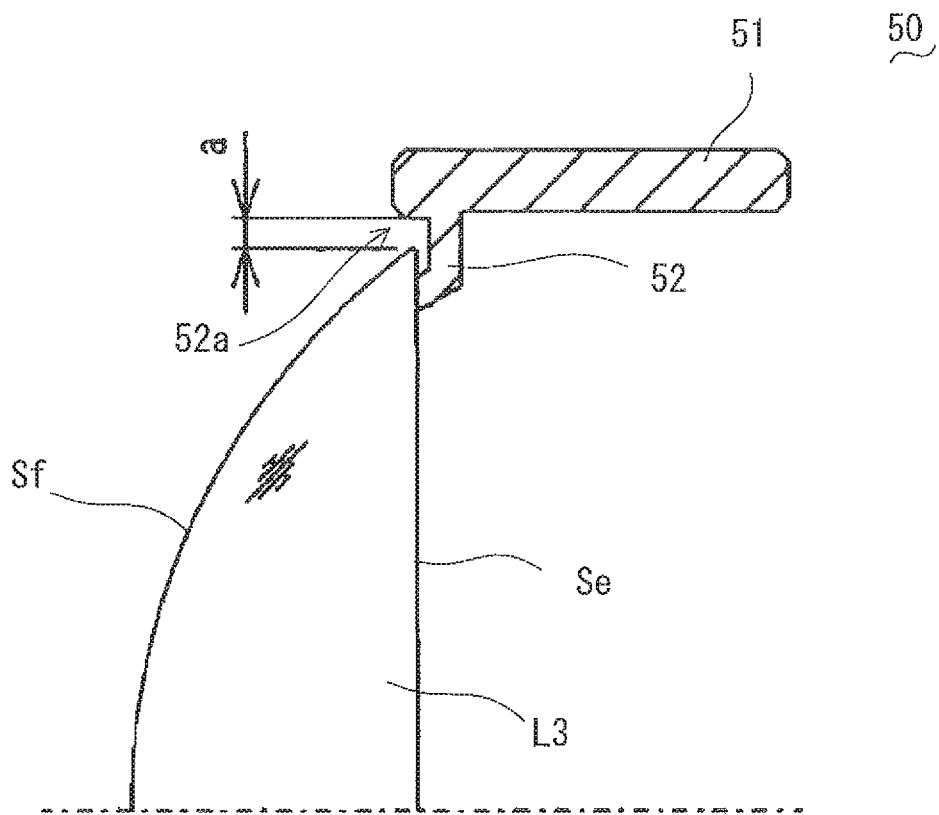
FIG. 14 is a cross-sectional view of a lens-portion set before an adhesive is applied according to a third embodiment.
Figure 15:
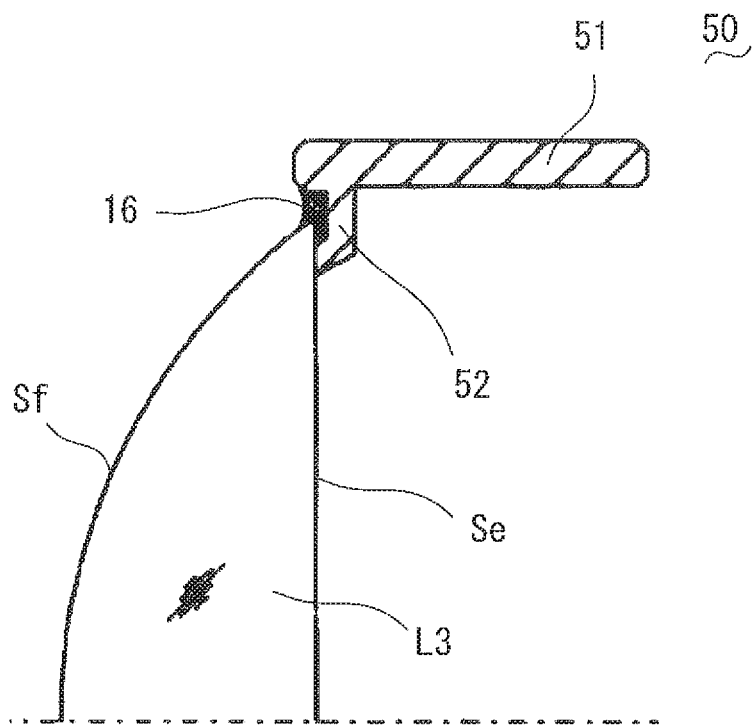
FIG. 15 is a cross-sectional view of the lens-portion set after an adhesive is applied according to the third embodiment.

FIG. 14 is a cross-sectional view of a lens-portion set 50 before an adhesive is applied according to the present embodiment. FIG. 15 is a cross-sectional view of the lens-portion set 50 after an adhesive is applied according to the present embodiment. The lens-portion set 50 according to the present embodiment is different from the lens-portion set 30 in that it includes a lens L3 instead of lens L1, and a lens retaining frame 51 instead of the lens retaining frame 31, and that the lens retaining frame 51 is in contact with the lens L3 on a flat plane surface (lens surface Se).

The lens L3 is a lens that constitutes a microscope objective and is a plano-convex lens without an edge surface that has a flat plane lens surface Se and a convex lens surface Sf.

The lens retaining frame 51 is a tubular member that is inserted into the body of the microscope objective when the microscope objective is assembled. The lens retaining frame 51 has a protrusion 52 that protrudes in the radial direction (specifically, inward in the radial direction). Further, a concavity 52a whose aperture is oriented in the axial direction is formed in the protrusion 52.

The lens-portion set 50 according to the present embodiment is also manufactured by a procedure similar to the procedure illustrated in FIG. 3. Specifically, the lens L3 is arranged in the lens retaining frame 51 such that the lens surface Se of the lens L3 is brought into contact with the protrusion 52 (Step S1 in FIG. 3). In particular, the lens L3 is arranged in the lens retaining frame 51 such that the lens L3 covers at least a portion of the concavity 52a. For example, the lens L3 may be brought close to the lens retaining frame 51 in the axial direction of the lens retaining frame 51 from the direction in which the aperture of the concavity 52a is oriented (from the left side of FIG. 14). Then, the lens L3 may be arranged in the lens retaining frame 51 by bringing the lens surface Se of the lens L3 into contact with the edge portion 52 such that a gap (a) is created between the inner diameter surface of the lens retaining frame 51 that constitutes the concavity 52a and the lens L3. It is preferable that the gap (a) have a length greater than or equal to 0.5 mm in the radial direction.

When the lens L3 has been arranged in the lens retaining frame 51, the adhesive 16 is then filled into a space formed between the lens surface Se and the protrusion 52 and the space is being partitioned in the axial direction by the lens surface Se and the protrusion 52 (Step S2 in FIG. 3). Here, the adhesive 16 is introduced into the concavity 52a through the gap (a) to fill the adhesive 16 into the concavity 52a, as illustrated in FIG. 15. Then, the positioning of the lens L3 with respect to the lens retaining frame 51 is performed repeatedly while curing the adhesive 16 gradually (Steps S3 and S4 in FIG. 3), and the adhesive 16 is cured completely after the eccentricity of the lens L3 has been adjusted (Step S5 in FIG. 3).

As in the first and second embodiments, the present embodiment permits a realization of at least one of a high numerical aperture and a long working distance while retaining a lens with a sufficient retention force. Further, as in the first and second embodiments, various modifications may be made to the present embodiment.

Figure 16:
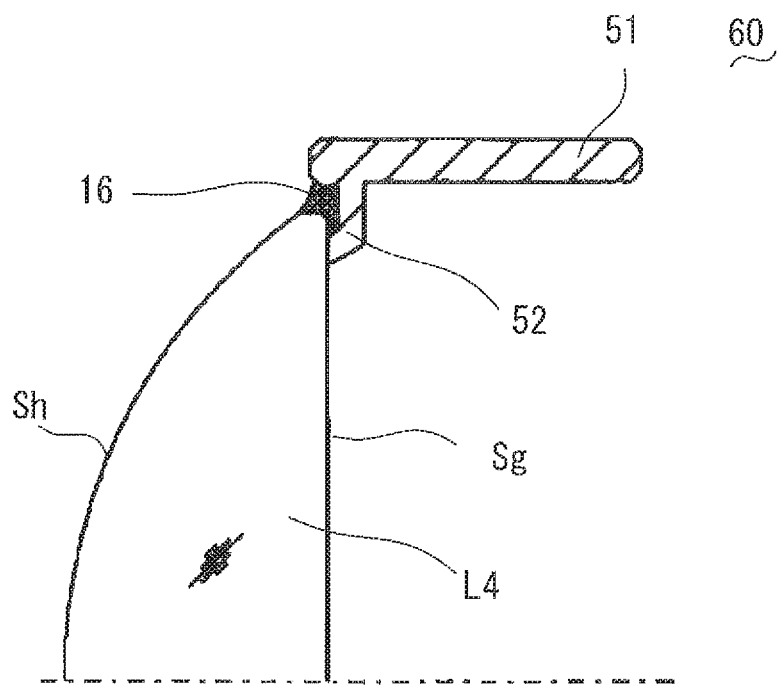
FIG. 16 illustrates a variation of the lens-portion set according to the third embodiment.

FIG. 16 illustrates a variation of the lens-portion set 50 according to the present embodiment. FIG. 15 illustrates an example of the lens retaining frame 51 retaining the lens L3 that is a lens without an edge surface, but a lens retained by the lens retaining frame 51 is not limited to the lens without an edge surface. The lens retaining frame 51 may retain a lens L4 that is a lens with an edge surface, as in a lens-portion set 60 illustrated in FIG. 16. The lens L4 illustrated in FIG. 16 has a flat plane lens surface Sg and a convex lens surface Sh.

The embodiments described above are just examples to facilitate understanding of the present invention, and the embodiment of the present invention is not limited to these examples. Various modifications and alterations may be made to a lens retaining method, a method for manufacturing a lens-portion set, and a lens-portion set without departing from the scope of the invention specified in the claims.

For example, the lens-portion sets used for a microscope objective have been illustrated in the examples described above, but the application of a lens-portion set is not limited to the microscope objective. Further, the example in which a lens to be fixed in a lens retaining frame is a single lens has been described, but the lens to be fixed in a lens retaining frame is not limited to the single lens, and it may be a cemented lens.

What is claimed is:

1. A lens retaining method for retaining a lens in a lens retaining frame, the lens retaining method comprising:
arranging the lens in the lens retaining frame such that a lens surface of the lens is brought into contact with a protrusion of the lens retaining frame that protrudes in a radial direction;
filling, after the lens has been arranged, an adhesive into a space formed between the lens surface and the protrusion, the space being partitioned in an axial direction by the lens surface and the protrusion; and
curing the adhesive after the adhesive has been filled into the space.

2. The lens retaining method according to claim 1, wherein:
the arranging of the lens includes arranging the lens such that the lens covers at least a portion of a concavity that is formed the protrusion and whose aperture is oriented in the axial direction, and
the filling in of the adhesive includes filling the adhesive into at least a space included in the concavity that is formed between the lens surface and the protrusion, the space being partitioned in the axial direction by the lens surface and the protrusion.

3. The lens retaining method according to claim 2, wherein the arranging of the lens includes arranging the lens such that a gap is created between an inner diameter surface that is situated outermost in the radial direction among surfaces that form the concavity, and the lens.

4. The lens retaining method according to claim 3, wherein the gap has a length greater than or equal to 0.5 mm in the radial direction.

5. The lens retaining method according to claim 4, further comprising performing positioning of the lens with respect to the lens retaining frame after the adhesive has been filled into the space.

6. The lens retaining method according to claim 4, wherein:
the protrusion includes a second protrusion that protrudes in the axial direction, and
the arranging of the lens includes arranging the lens such that the lens surface is brought into contact with the second protrusion.

7. The lens retaining method according to claim 3, further comprising performing positioning of the lens with respect to the lens retaining frame after the adhesive has been filled into the space.

8. The lens retaining method according to claim 7, wherein:
the protrusion includes a second protrusion that protrudes in the axial direction, and
the arranging of the lens includes arranging the lens such that the lens surface is brought into contact with the second protrusion.

9. The lens retaining method according to claim 3, wherein:
the protrusion includes a second protrusion that protrudes in the axial direction, and
the arranging of the lens includes arranging the lens such that the lens surface is brought into contact with the second protrusion.

10. The lens retaining method according to claim 2, further comprising performing positioning of the lens with respect to the lens retaining frame after the adhesive has been filled into the space.

11. The lens retaining method according to claim 10, wherein:
the protrusion includes a second protrusion that protrudes in the axial direction, and
the arranging of the lens includes arranging the lens such that the lens surface is brought into contact with the second protrusion.

12. The lens retaining method according to claim 2, wherein:
the protrusion includes a second protrusion that protrudes in the axial direction, and
the arranging of the lens includes arranging the lens such that the lens surface is brought into contact with the second protrusion.

13. The lens retaining method according to claim 1, further comprising performing positioning of the lens with respect to the lens retaining frame after the adhesive has been filled into the space.

14. The lens retaining method according to claim 13, wherein:
the protrusion includes a second protrusion that protrudes in the axial direction, and
the arranging of the lens includes arranging the lens such that the lens surface is brought into contact with the second protrusion.

15. The lens retaining method according to claim 1, wherein:
the protrusion includes a second protrusion that protrudes in the axial direction, and
the arranging of the lens includes arranging the lens such that the lens surface is brought into contact with the second protrusion.

16. The lens retaining method according to claim 1, wherein the adhesive has a viscosity that is greater than or equal to 30 Pas at a temperature of 23 degrees.

17. A method for manufacturing a lens-portion set in which a lens and a lens retaining frame are adhered with an adhesive, the method comprising:
arranging the lens in the lens retaining frame such that a lens surface of the lens is brought into contact with a protrusion of the lens retaining frame that protrudes in a radial direction;
filling, after the lens has been arranged, an adhesive into a space formed between the lens surface and the protrusion, the space being partitioned in an axial direction by the lens surface and the protrusion; and
curing the adhesive after the adhesive has been filled into the space.

18. A lens-portion set comprising:
a lens retaining frame that has a protrusion that protrudes in a radial direction;
a lens that has a lens surface and is arranged in the lens retaining frame such that the lens surface is brought into contact with the protrusion; and
an adhesive that is filled into a space between the lens surface and the protrusion, the space being partitioned in an axial direction by the lens surface and the protrusion,
wherein:

the protrusion includes a second protrusion that protrudes in the axial direction, and the lens is arranged such that the lens surface contacts the second protrusion.

19. The lens-portion set according to claim 18, wherein:

a concavity whose aperture is oriented in the axial direction is formed by the protrusion, the lens is arranged in the lens retaining frame such that the lens covers at least a portion of the concavity, and the adhesive is filled into at least a space included in the concavity that is formed between the lens surface and the protrusion, the space being partitioned in the axial direction by the lens surface and the protrusion.

20. The lens-portion set according to claim 18, wherein the adhesive is provided between the lens surface and the protrusion, and the adhesive does not contact an inner diameter surface of the lens retaining frame that is situated outermost in the radial direction among surfaces that form the concavity.

\* \* \* \* \*